(12) United States Patent
Tateno et al.

(10) Patent No.: US 9,633,308 B2
(45) Date of Patent: Apr. 25, 2017

(54) INFORMATION PROCESSING APPARATUS, INFORMATION PROCESSING METHOD, AND PROGRAM FOR EVALUATING CONTENT

(71) Applicant: SONY CORPORATION, Tokyo (JP)

(72) Inventors: Kei Tateno, Tokyo (JP); Mari Saito, Kanagawa (JP); Yoshiyuki Kobayashi, Tokyo (JP); Ryo Mukaiyama, Tokyo (JP); Hideyuki Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 378 days.

(21) Appl. No.: 13/864,525

(22) Filed: Apr. 17, 2013

(65) Prior Publication Data

US 2013/0318013 A1 Nov. 28, 2013

(30) Foreign Application Priority Data

May 28, 2012 (JP) ................................ 2012-120723

(51) Int. Cl.
| | | |
|---|---|---|
| *G06F 15/18* | (2006.01) | |
| *G06N 5/02* | (2006.01) | |
| *G06N 5/04* | (2006.01) | |
| *H04N 21/262* | (2011.01) | |
| *H04N 21/475* | (2011.01) | |
| *G06F 17/30* | (2006.01) | |

(52) U.S. Cl.
CPC ......... *G06N 5/02* (2013.01); *G06F 17/30053* (2013.01); *G06N 5/04* (2013.01); *H04N 21/26258* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 2008/0077575 A1* | 3/2008 | Tateno et al. ..................... 707/5 |
| 2009/0077132 A1* | 3/2009 | Yamamoto ........ G06F 17/30867 |
| 2009/0144226 A1* | 6/2009 | Tateno ............. G06F 17/30867 |
| 2010/0262570 A1* | 10/2010 | Tateno et al. ................... 706/12 |

FOREIGN PATENT DOCUMENTS

JP 2011-221133 11/2011

* cited by examiner

*Primary Examiner* — Kakali Chaki
*Assistant Examiner* — Mai T Tran
(74) *Attorney, Agent, or Firm* — Chip Law Group

(57) ABSTRACT

There is provided an information processing apparatus including an evaluation giving unit that gives an evaluation based on a second user to an item in a list created on a basis of a first user, and a display control unit that controls display of the list, on a basis of the evaluation based on the second user.

10 Claims, 10 Drawing Sheets

| CONTENT ID | TEMPO | SOUND DENSITY | RHYTHM MUSICAL INSTRUMENT RATIO |
|---|---|---|---|
| C1 | 60 | 30 | 25 |
| C2 | 30 | 70 | 60 |
| C3 | 25 | 65 | 30 |
| C4 | 55 | 40 | 60 |
| ... | | | |

FIG. 4

| USER ID | CONTENT ID | EVALUATION VALUE |
|---|---|---|
| U1 | C1 | 1 |
| U1 | C2 | 5 |
| U1 | C3 | 4 |
| U1 | C4 | 2 |
| ... | | |

FIG. 5

| USER ID | TEMPO | SOUND DENSITY | RHYTHM MUSICAL INSTRUMENT RATIO | CONSTANT TERM |
|---|---|---|---|---|
| U1 | −0.074 | 0.053 | 0.0021 | 3.30 |

FIG. 6

| CONTENT ID | TEMPO | SOUND DENSITY | RHYTHM MUSICAL INSTRUMENT RATIO |
|---|---|---|---|
| C11 | 20 | 60 | 30 |
| C12 | 55 | 35 | 40 |
| C13 | 30 | 55 | 40 |
| C14 | 25 | 55 | 30 |
| C15 | 65 | 40 | 20 |

FIG. 7

| CONTENT ID | SCORE |
|---|---|
| C11 | 5.06 |
| C12 | 1.17 |
| C13 | 4.08 |
| C14 | 4.43 |
| C15 | 0.65 |

FIG. 8

| PLAYLIST ID | USER ID |
|---|---|
| PL1 | U1 |
| PL2 | U2 |
| PL3 | U2 |
| ... | ... |

| PLAYLIST ID | INTRA-PLAYLIST ORDER | CONTENT ID | SCORE |
|---|---|---|---|
| PL1 | 1 | C11 | 5.06 |
| PL1 | 2 | C14 | 4.43 |
| PL1 | 3 | C13 | 4.08 |
| PL2 | 1 | C15 | 5.44 |
| PL2 | 2 | C12 | 5.06 |
| ... | | | |

FIG. 11

| USER ID | TEMPO | SOUND DENSITY | RHYTHM MUSICAL INSTRUMENT RATIO | CONSTANT TERM |
|---|---|---|---|---|
| U2 | 0.068 | −0.055 | 0.001 | 3.20 |

FIG. 12
| CONTENT ID | EVALUATION VALUE | |
|---|---|---|
| | USER U1 | USER U2 |
| C21 | 1 | 3 |
| C22 | 3 | 2 |
| C23 | 5 | 1 |
FIG. 13
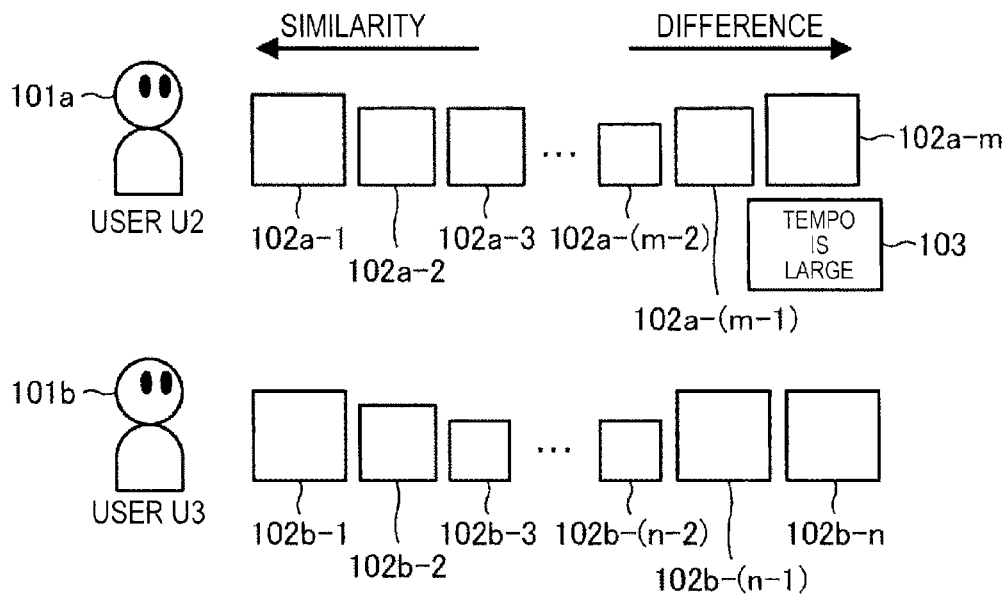
FIG. 14
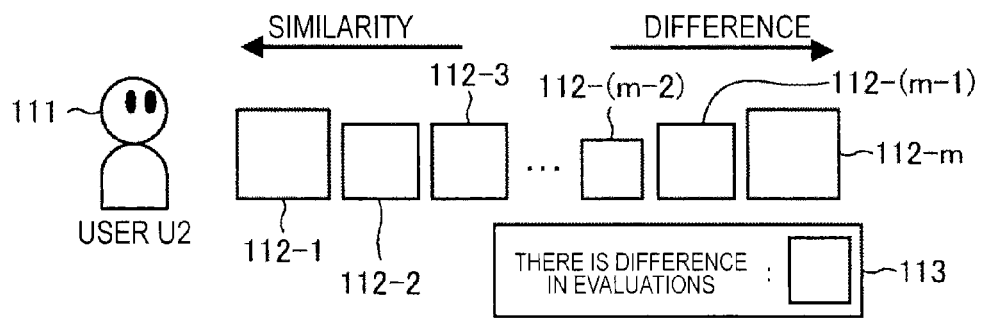

INFORMATION PROCESSING APPARATUS, INFORMATION PROCESSING METHOD, AND PROGRAM FOR EVALUATING CONTENT

BACKGROUND

The present disclosure relates to an information processing apparatus, an information processing method, and a program and more particularly, to an information processing apparatus, an information processing method, and a program that are used suitably when a list of items is provided to a user.

In the related art, in a distribution service of content such as a moving image or music, a function for sharing a playlist to be a list of content created by a user has been generally used.

Recently, a service for automatically creating a playlist according to a personal taste and providing the playlist has also been suggested (for example, refer to JP 2011-221133A).

SUMMARY

Under such situation, it is necessary to grasp a difference between a playlist provided from a server and the taste of a user.

It is desirable to enable a difference between a playlist provided from a server and the taste of a user to be easily grasped.

According to an embodiment of the present disclosure, there is provided an information processing apparatus including an evaluation giving unit that gives an evaluation based on a second user to an item in a list created on a basis of a first user; and a display control unit that controls display of the list, on a basis of the evaluation based on the second user.

The information may further include a reason extracting unit that extracts a reason why an item in which an evaluation based on the second user is low is included in the list. The display control unit may perform control in a manner that the extracted reason is displayed together with the list.

The evaluation giving unit may give an evaluation to an item in the list, using a model for predicting an evaluation of the second user with respect to the item on a basis of a feature amount of the item. The reason extracting unit may extract a feature amount in which a difference in evaluations between the first user and the second user is large among feature amounts of items, as the reason.

The evaluation giving unit may give an evaluation to an item in the list, by collaborative filtering based on an evaluation having given by the second user with respect to the item. The reason extracting unit may extract an item in which a difference in evaluations between the first user and the second user is large among items already evaluated by the first user and the second user, as the reason.

The evaluation giving unit may give an evaluations to an item in the list, on a basis of a condition created by the second user. The reason extracting unit may extract the condition where a satisfaction ratio of items in the list is low, as the reason.

The information processing apparatus may further include a learning unit that learns a model for predicting an evaluation of each user with respect to an item, on a basis of a feature amount of the item. The evaluation giving unit may give an evaluation to an item in the list created using the model of the first user, using the model of the second user.

The evaluation giving unit may give an evaluation to an item in the list created on a basis of an evaluation predicted by collaborative filtering based on an evaluation having given by the first user with respect to an item, by the collaborative filtering based on an evaluation having given by the second user with respect to an item.

The evaluation giving unit may give an evaluation to an item in the list created on a basis of a condition created by the first user, on a basis of a condition created by the second user.

The display control unit may perform control in a manner that items in the list are distinguished by the evaluation based on the second user and may be displayed.

The display control unit may perform control in a manner that an item in which an evaluation based on the second user is low is emphasized and is displayed.

According to an embodiment of the present disclosure, there is provided an information processing method performed by an information processing apparatus, the method including giving an evaluation based on a second user to an item in a list created on a basis of a first user, and controlling display of the list, on a basis of the evaluation based on the second user.

According to an embodiment of the present disclosure, there is provided a program for causing a computer to execute processing including giving an evaluation based on a second user to an item in a list created on a basis of a first user, and controlling display of the list, on a basis of the evaluation based on the second user.

According to the embodiment of the present disclosure, the evaluations based on the second user are given to the items in the list created on the basis of the first user and the display of the list is controlled on the basis of the evaluations based on the second user.

According to the embodiments of the present disclosure described above, a difference between a list of items provided from a server and the taste of a user can be easily grasped.

BRIEF DESCRIPTION OF THE DRAWINGS

FIG. 4 is a diagram showing an example of an evaluation value of a user with respect to content;

FIG. 5 is a diagram showing an example of a user profile;

FIG. 6 is a diagram showing an example of feature amounts of content;

FIG. 7 is a diagram showing an example of scores given to content;

FIG. 8 is a diagram showing a configuration example of a playlist-user table;

FIG. 11 is a diagram showing an example of a user profile;

FIG. 12 is a diagram showing an example of evaluation values of users with respect to content;

FIG. 13 is a diagram showing a first example of a method of displaying a playlist;

FIG. 14 is a diagram showing a second example of a method of displaying a playlist;

DETAILED DESCRIPTION OF THE EMBODIMENT(S)

Figure 1:
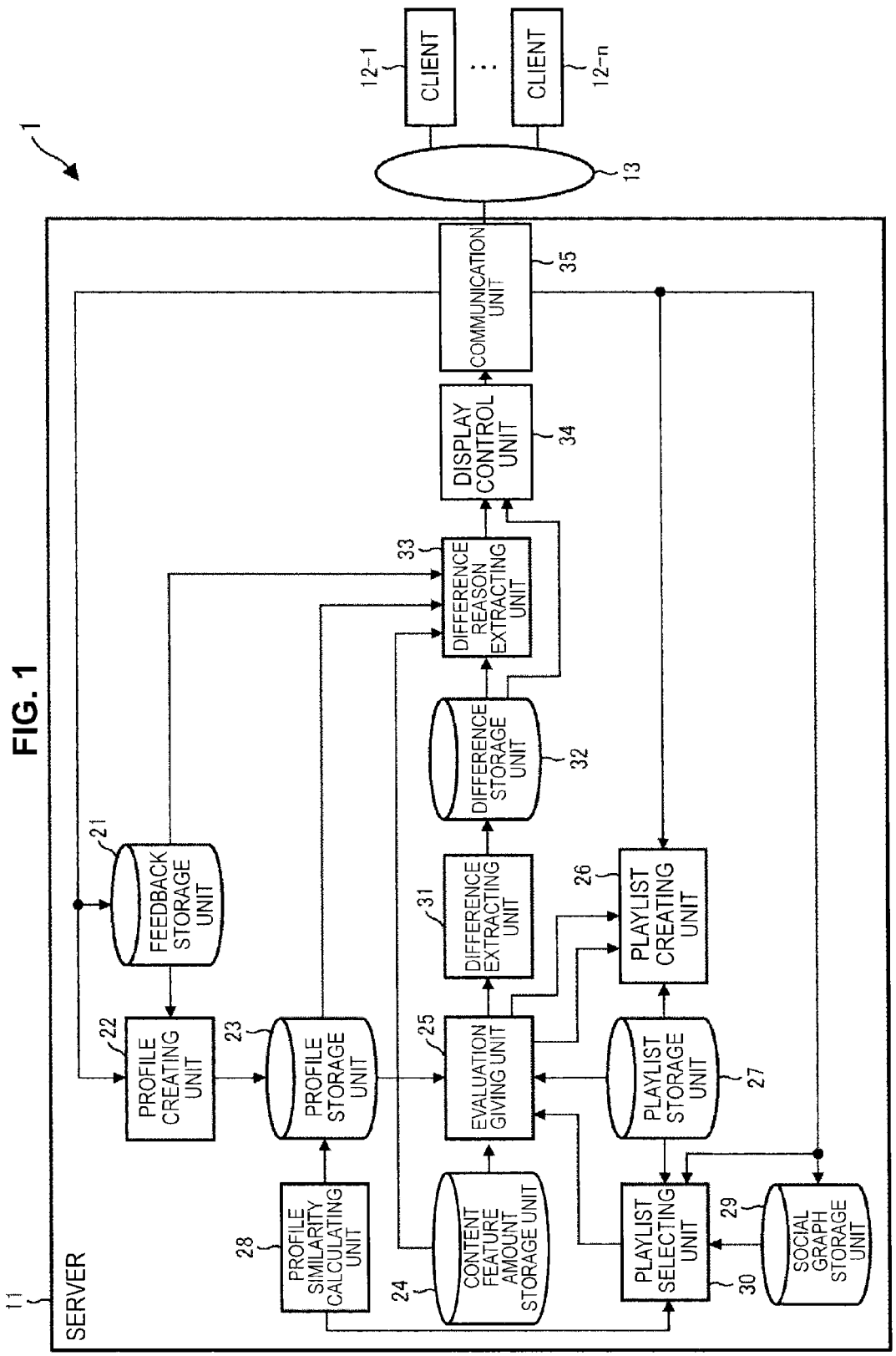
FIG. 1 is a block diagram showing an embodiment of an information processing system to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Embodiment
2. Modifications

1. Embodiment

Configuration Example of Information Processing System 1

FIG. 1 is a block diagram showing an embodiment of an information processing system to which the present disclosure is applied.

An information processing system 1 includes a server 11 and clients 12-1 to 12-*n*. The server 11 and the clients 12-1 to 12-*n* are mutually connected through a network 13.

Hereinafter, when it is not necessary to individually distinguish the clients 12-1 to 12-*n*, the clients 12-1 to 12-*n* are simply referred to as the clients 12.

The server 11 provides a distribution service of content such as a moving image or music to each client 12. The server 11 has a function of supporting creation of a playlist to be a list of content or making the playlist created by each user shared between a plurality of users. In addition, the server 11 has a function of automatically creating the playlist and providing the playlist to each user.

Hereinafter, explanation is given on the basis of an example of the case in which the server 11 provides a music distribution service.

The server 11 includes a feedback storage unit 21, a profile creating unit 22, a profile storage unit 23, a content feature amount storage unit 24, an evaluation giving unit 25, a playlist creating unit 26, a playlist storage unit 27, a profile similarity calculating unit 28, a social graph storage unit 29, a playlist selecting unit 30, a difference extracting unit 31, a difference storage unit 32, a difference reason extracting unit 33, a display control unit 34, and a communication unit 35. In FIG. 1, only portions of the server 11 relating to creation and provision of the playlist are mainly shown and the other portions are not partially shown.

The feedback storage unit 21 collects information regarding feedback (hereinafter, referred to as feedback information) of each user with respect to content, from information transmitted from each client 12 to the communication unit 35 through the network 13, and stores the feedback information. In this case, the feedback with respect to the content is a reaction of each user with respect to the content. For example, the feedback with respect to the content is expressed by likes and dislikes or five steps of evaluations.

The profile creating unit 22 creates a user profile of each user, on the basis of the feedback information stored in the feedback storage unit 21 and a command supplied from each client 12 through the network 13 and the communication unit 35. In this case, the user profile is data that shows the taste of each user with respect to the content and is used for predicting an evaluation of the user with respect to each content. The profile creating unit 22 stores the created user profile of each user in the profile storage unit 23.

The content feature amount storage unit 24 stores information that shows a feature amount of each content distributed by the server 11.

The evaluation giving unit 25 predicts an evaluation of each user with respect to each content, on the basis of the user profile stored in the profile storage unit 23 and the feature amount of each content stored in the content feature amount storage unit 24. The evaluation giving unit 25 gives a score showing the predicted evaluation to each content. The evaluation giving unit 25 supplies information showing the score of each content evaluated by each user to the playlist creating unit 26.

The evaluation giving unit 25 reads information regarding the playlist selected by the playlist selecting unit 30 (hereinafter, referred to as an object playlist), from the playlist storage unit 27. On the basis of a user profile of a user who becomes a provision object of the object playlist (hereinafter, referred to as an active user) and a feature amount of content, the evaluation giving unit 25 predicts an evaluation of the active user with respect to the content in the object playlist. The evaluation giving unit 25 gives a score showing the predicted evaluation to each content in the object playlist. The evaluation giving unit 25 adds information showing the score of each content in the playlist to information regarding the object playlist and supplies the information to the difference extracting unit 31.

The playlist creating unit 26 creates a playlist, on the basis of the information showing the score of each content evaluated by each user to be supplied from the evaluation giving unit 25 and the command supplied from each client 12 through the network 13 and the communication unit 35. The playlist creating unit 26 stores the created playlist in the playlist storage unit 27.

The profile similarity calculating unit 28 calculates similarities of the user profiles of the users and supplies information showing the calculated similarities to the playlist selecting unit 30.

The social graph storage unit 29 collects information regarding a social graph showing a relationship between the users on a social service, from information transmitted from each client 12 to the communication unit 35 through the network 13 and stores the information.

The social service may be a service provided by the server 11 or a service provided by another server. For example, information showing a social graph of a social service provided by another server may be acquired from the corresponding server and may be stored in the social graph storage unit 29.

The playlist selecting unit 30 selects the object playlist to be provided to the active user, from the playlists stored in the playlist storage unit 27, on the basis of the similarities of the user profiles of the users, the social graphs stored in the social graph storage unit 29, and the command supplied from each client 12 through the network 13 and the communication unit 35. The playlist selecting unit 30 supplies a selection result of the object playlist to the evaluation giving unit 25.

The difference extracting unit 31 extracts content that is less likely to be included in the playlist created on the basis of the active user among the content in the object playlist, as difference content. In this case, the playlist that is created on the basis of the certain user is a playlist according to the taste of the corresponding user. For example, the playlist includes a playlist that is created by the corresponding user or is created using the user profile of the corresponding user. The difference extracting unit 31 adds information showing the difference content to the information regarding the object playlist and stores the information in the difference storage unit 32.

The difference reason extracting unit 33 extracts a difference reason showing the reason why the difference content is included in the object playlist, on the basis of the feedback information stored in the feedback storage unit 21, the user profiles stored in the profile storage unit 23, the feature amount of each content stored in the content feature amount storage unit 24, and the information regarding to the object playlist stored in the difference storage unit 32. The difference reason extracting unit 33 supplies information showing the extracted difference reason to the display control unit 34.

The display control unit 34 reads the information regarding the object playlist from the difference storage unit 32 and generates playlist display data to display the object playlist. In addition, the display control unit 34 transmits the playlist display data to the client 12 of the active user through the communication unit 35 and the network 13 and controls display of the playlist in the client 12 of the active user.

The communication unit 35 performs communication with each client 12 through the network 13 and transmits and receives various information or commands relating to the content distribution service.

[Playlist Creation Processing]

Next, playlist creation processing that is executed by the server 11 will be described with reference to a flowchart of FIG. 2.

In step S1, the profile creating unit 22 creates the user profile of each user. The profile creating unit 22 stores the created user profile of each user in the profile storage unit 23.

In step S2, the evaluation giving unit 25 and the playlist creating unit 26 create the playlist. The playlist creating unit 26 stores the created playlist in the playlist storage unit 27.

Then, the playlist creation processing ends.

In this case, a specific example of the playlist creation processing will be described.

(Case of Using CBF)

First, the case in which the playlist is created using content-based filtering (CBF) will be described.

First, the profile creating unit 22 combines the feedback of each user with respect to the content and the feature amount of the content and learns a model for predicting an evaluation of each user with respect to the content, on the basis of the feature amount of the content, using a method such as multivariate analysis or machine learning. In addition, the profile creating unit 22 stores a parameter of the learned model as the profile of each user in the profile storage unit 23.

In this case, a specific example of a method of creating the user profile will be described with reference to FIGS. 3 to 5. FIG. 3 shows a specific example of feature amounts of content. In this example, three kinds of feature amounts of a tempo, a sound density, and a rhythm musical instrument ratio are calculated with respect to each content. FIG. 4 shows a specific example of an evaluation value of a user U1 with respect to each content.

Figures 2, 3:
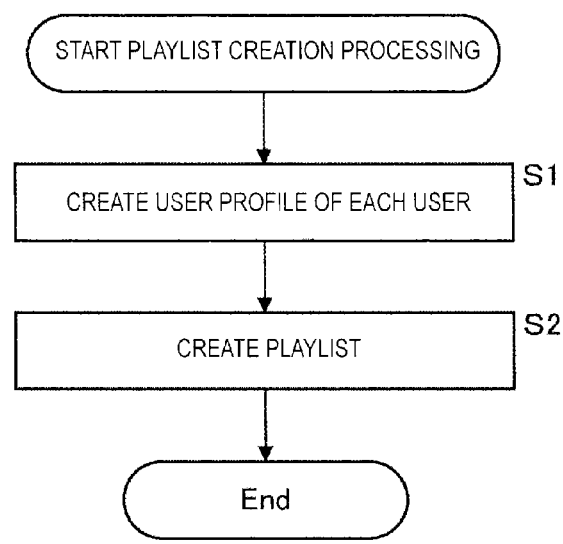
FIG. 2 is a flowchart showing playlist creation processing.
FIG. 3 is a diagram showing an example of feature amounts of content.

When linear regression is performed on the basis of the content feature amounts shown in FIG. 3 and the evaluation values with respect to the content shown in FIG. 4, weight of each feature amount and a constant term in a regression function are calculated, as shown in FIG. 5. The profile creating unit 22 creates a profile including the weight of each feature amount and the constant term in the regression function as a profile of the user U1. In addition, the profile creating unit 22 stores the created user profile of the user U1 in the profile storage unit 23.

Next, the evaluation giving unit 25 and the playlist creating unit 26 create a playlist based on each user, using the user profile of each user created by the profile creating unit 22.

For example, the case in which a playlist based on the user U1 is created on the basis of the user profile of the user U1 shown in FIG. 5, using candidates of content for a playlist shown in FIG. 6, will be described. Similar to FIG. 3, FIG. 6 shows feature amounts with respect to a tempo, a sound density, and a rhythm musical instrument ratio of each of pieces of content C11 to C15.

The evaluation giving unit 25 predicts evaluation values of the user U1 with respect to the pieces of content C11 to C15, using the user profile shown in FIG. 5, and gives scores showing the predicted evaluation values to the pieces of content, respectively. The evaluation giving unit 25 supplies information showing the score of the user U1 with respect to each content to the playlist creating unit 26.

FIG. 7 shows the scores based of the prediction evaluation values of the user U1 with respect to the pieces of content C11 to C15.

When the content evaluated by the user is included in the candidates of the content for the playlist, instead of the prediction evaluation values, the actual evaluation values may be used as the scores.

Next, the playlist creating unit 26 extracts the content of which the scores become equal to or larger than a predetermined threshold value, arranges the content in order of the content having the high scores, and creates a playlist. For example, when the threshold value is set to 3 in an example of FIG. 7, the pieces of content C11, C13, and C14 are extracted and a playlist in which the pieces of content are arranged in order of the pieces of content C11, C14, and C13 is created as the playlist based on the user U1. In addition, the playlist creating unit 26 stores the created playlist in the playlist storage unit 27.

(Case of Using CF)

Next, the case in which the playlist is created using collaborative filtering (CF) will be described.

First, the profile creating unit 22 creates a set of evaluation values that each user has given to each content as the user profile of each user without using the feature amounts of the content and stores the user profile in the profile storage unit 23.

Next, the evaluation giving unit 25 and the playlist creating unit 26 create the playlist based on each user, using the user profile of each user created by the profile creating unit 22.

Specifically, first, the evaluation giving unit 25 performs the collaborative filtering on the basis of the evaluation values with respect to the content that the user has given and predicts the evaluation values of the user with respect to the candidates of the content for the playlist. The evaluation giving unit 25 gives the score showing the predicted evaluation value to each content. The evaluation giving unit 25 supplies information showing the score with respect to each content to the playlist creating unit 26.

By setting a Peason correlation value $\rho_{uv}$ of a set of evaluation values (user profile) of a user u and a set of evaluation values of another user v as the weight between the users, on the basis of the set of evaluation values of the user u, a prediction evaluation value Ei of content i that is not evaluated by the user u can be calculated by the following expression 1.

$$Ei = ar_u + \frac{\sum_{v \in U} \rho_{uv} r_{vi}}{\sum_{v \in U} |\rho_{uv}|} \quad (1)$$

In this case, $ar_u$ shows an average of the evaluation values of the user u and $r_{vi}$ shows an evaluation value of the user v with respect to the content i.

When the content evaluated by the user is included in the candidates of the content for the playlist, instead of the prediction evaluation values, the actual evaluation values may be used as the scores.

Next, the playlist creating unit 26 extracts the content of which the scores become equal to or larger than a predetermined threshold value, arranges the content in order of the content having the high scores, and creates a playlist, similar to the case of using the CBF.

(Case of Using Rule Made by User)

Next, the case in which a playlist is created using a rule made by a user will be described.

For example, the profile creating unit 22 makes a rule, which includes one or more conditions based on feature amounts of content (hereinafter, referred to as content determination conditions) and is used for extracting or evaluating the content, as a user profile, on the basis of a command from each user. The content determination conditions are, for example, that a "tempo is 60 or more" and a "sound density is equal to or larger than 40 and is smaller than 60".

At this time, the user may set the content determination conditions directly or may select the content determination conditions from a plurality of content determination conditions arranged in advance. The user may combine the plurality of content determination conditions by AND or OR and make a rule. The profile creating unit 22 stores the user profile composed of the rule made by each user in the profile storage unit 23.

Next, the evaluation giving unit 25 calculates an achievement rate of each content for the playlist with respect to the content determination conditions in the user profile of the user becoming a standard and gives a score showing the calculated achievement rate to each content. For example, when the number of content determination conditions is 1, the score is represented by binary values of 0 and 1 and when the number of content determination conditions is 2, the score is represented by three values of 0, 0.5, and 1. The evaluation giving unit 25 supplies information showing the score with respect to each content to the playlist creating unit 26.

In the calculation of the achievement rate, the two or more content determination conditions that are combined by OR are collectively regarded as one content determination condition. For example, when the two content determination conditions are shown as (condition determination condition 1 OR content determination condition 2) in the user profile, the two content determination conditions are collectively regarded as one content determination condition. Meanwhile, when the two content determination conditions are shown as (condition determination condition 1 AND content determination condition 2) in the user profile, the two content determination conditions are regarded as two different content determination conditions.

Similar to the case of using the CBF or the CF, the playlist creating unit 26 extracts the content of which the scores become equal to or larger than the predetermined threshold value, arranges the content in order of the content having the high scores, and creates a playlist.

(Other Playlist Creation Processing)

In addition to the case in which the playlist is automatically created using the user profile as described above, the user may create the playlist directly. For example, the playlist creating unit 26 arranges the content designated by the user in the designated order and creates a playlist. At this time, the user may give the score to each content in the playlist.

For example, the playlist creating unit 26 may create a playlist common to each user, on the basis of recent charts or rankings by user voting. At this time, the playlist creating unit 26 may give a score to each content in the playlist, according to a predetermined standard.

Figures 9, 10:
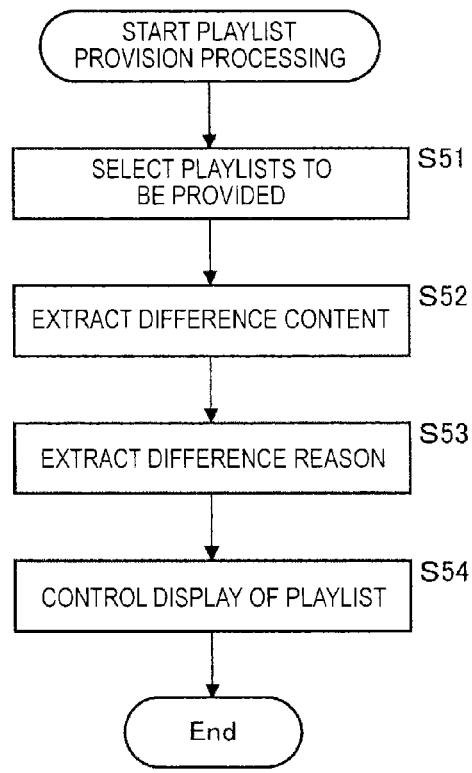
FIG. 9 is a diagram showing a configuration example of a playlist detail table.
FIG. 10 is a flowchart showing playlist provision processing.

FIGS. 8 and 9 show a configuration example of data that is stored in the playlist storage unit 27.

FIG. 8 shows a configuration example of a playlist-user table in which each playlist and each user are associated with each other. The playlist-user table includes two items of a playlist ID to identify a playlist and a user ID to identify a user. In this example, a playlist PL1 shows a playlist that is created on the basis of the user U1.

FIG. 9 shows a configuration example of a playlist detail table that shows the detail of each playlist. The playlist detail table includes four items of a playlist ID, intra-playlist order showing order of each content in a playlist, a content ID, and a score given to each content.

Hereinafter, a playlist that is created on the basis of a certain user is simply called a playlist of the corresponding user.

[Playlist Provision Processing]

Next, playlist provision processing that is executed by the server 11 will be described with reference to a flowchart of FIG. 10.

In step S51, the playlist selecting unit 30 selects playlists (object playlists) that are provided to the active user. A method of selecting the object playlists is not limited in particular. However, some specific examples of the method of selecting the object playlists are exemplified below.

For example, a method of selecting playlists of users similar to the active user is considered. In this case, the profile similarity calculating unit 28 calculates similarities of the user profiles between the active user and other users and supplies a calculation result to the playlist selecting unit 30. The playlist selecting unit 30 extracts users of the predetermined number in which the similarities are high or users in which the similarities are equal to or larger than a predetermined threshold value, as users similar to the active user. The playlist selecting unit 30 selects playlists of the predetermined number among playlists of the extracted users as the object playlists provided to the active user.

The users who are similar to the active user may be extracted on the basis of user attributes other than the user profiles.

For example, a method of selecting the playlists of the users associated with the active user is considered. In this case, the users who are associated with the active user are users who make a friendship with the active user on the social service provided by the server 11 or users that the active user follows.

The playlist selecting unit 30 extracts users of the predetermined number from the users associated with the active user, on the basis of the social graph stored in the social graph storage unit 29. In addition, the playlist selecting unit 30 selects the playlists of the predetermined number among the playlists of the extracted users as the object playlists provided to the active user.

For example, the active user may select the playlists directly. That is, the playlist selecting unit 30 selects the playlists designated by the active user among the playlists stored in the playlist storage unit 27 as the object playlists.

The playlist selecting unit 30 supplies a selection result of the object playlists to the evaluation giving unit 25.

Hereinafter, the user who becomes the standard when the object playlist is created is called a comparison object user. In other words, the object playlist is a playlist that is created using a user profile of the comparison object user or is created by the comparison object user.

In the playlist that is created by the playlist creating unit 26 on the basis of the charts or the rankings as described above and is common to each content, there is no comparison object user.

In step S52, the server 11 extracts difference content. Specifically, the evaluation giving unit 25 reads the information regarding the object playlist from the playlist storage unit 27 and gives a score based on the active user to each content in the object playlist. The evaluation giving unit 25 adds the information showing the score of each content in the playlist to the information regarding the object playlist and supplies the information to the difference extracting unit 31.

The difference extracting unit 31 extracts the difference content from the content in the object playlist, on the basis of the score of the active user. The difference extracting unit 31 adds the information showing the difference content to the information regarding the object playlist and stores the information in the difference storage unit 32.

In step S53, the difference reason extracting unit 33 extracts the difference reason showing the reason why the difference content is included in the object playlist. The difference reason extracting unit 33 supplies the information showing the extracted difference reason to the display control unit 34.

In this case, specific examples of the processing of steps S52 and S53 will be described.

(Case of Object Playlist Created Using CBF)

First, the case in which the difference content and the difference reason are extracted from the object playlist created using the CBF will be described.

First, the evaluation giving unit 25 calculates the score of each content in the object playlist, using the user profile of the active user, by the same method as the case of creating the playlist. Thereby, the score that is based on the active user is given to each content in the object playlist. The evaluation giving unit 25 adds the information showing the score of each content in the playlist to the information regarding the object playlist and supplies the information to the difference extracting unit 31.

The difference extracting unit 31 extracts the content in which the score of the active user is smaller than the predetermined threshold value among the content included in the object playlist, as the difference content. In addition, the difference extracting unit 31 adds the information showing the difference content to the information regarding the object playlist and stores the information in the difference storage unit 32.

Next, the difference reason extracting unit 33 extracts the feature amount of the content that becomes the reason why the score of the difference content has become low, as the difference reason. That is, the difference reason extracting unit 33 extracts the feature amount in which a difference of evaluations of the active user and the comparison object user is large among the feature amounts of the content, as the difference reason.

For example, when the user profile is created using the linear regression, the difference reason extracting unit 33 extracts the feature amount in which a set of {the regression coefficient of the active user, the regression coefficient of the comparison object user, and the feature amount of the difference content} becomes {small, large, positive value} or {large, small, negative value}, as the difference reason. The former is a feature amount in which the evaluation of the active user is low, the evaluation of the comparison object user is high, and the positive value is taken, among the feature amounts of the difference content. The latter is a feature amount in which the evaluation of the active user is high, the evaluation of the comparison object user is low, and the negative value is taken, among the feature amounts of the difference content. In both the cases, the score of the active user with respect to the feature amount becomes greatly lower than the score of the comparison object user.

For example, the case in which the user profiles (regression coefficients) of the user U1 (active user) and the user U2 (comparison object user) are as shown in FIGS. 5 and 11 and the playlist PL2 of FIG. 9 is selected as the object playlist is examined.

In this case, the regression coefficient with respect to the tempo is small for the user U1 and is large for the user U2 and the difference of the regression coefficients is large. In both the content C15 and the content C12 in the playlist PL2, the feature amount with respect to the tempo becomes a positive value, as shown in FIG. 6. Therefore, in this case, the tempo among the feature amounts of the content is extracted as the difference reason.

With respect to the magnitude of the regression coefficient, when the regression coefficient is larger than an average of the regression coefficients of all users by 1σ (standard deviation) or more, it is determined that the regression coefficient is large and when the regression coefficient is smaller than the average of the regression coefficients of all users by 1σ or more, it is determined that the regression coefficient is small. With respect to the feature amount of the difference content, not only the positive and negative values but also information on whether an absolute value is equal to or larger than a predetermined threshold value may be included in a determination standard.

The difference reason extracting unit 33 supplies the information showing the extracted difference reason to the display control unit 34.

(Case of Object Playlist Created Using CF)

Next, the case in which the difference content and the difference reason are extracted from the object playlist created using the CF will be described.

First, the evaluation giving unit 25 calculates the score of each content in the object playlist, using the user profile of the active user, by the same method as the case of creating the playlist. Thereby, the score that is based on the active user is given to each content in the object playlist. The evaluation giving unit 25 adds the information showing the score of each content in the playlist to the information regarding the object playlist and supplies the information to the difference extracting unit 31.

The difference extracting unit 31 extracts the content in which the score is smaller than the predetermined threshold value among the content in the object playlist, as the difference content. In addition, the difference extracting unit 31 adds the information of the difference content to the information regarding the object playlist and stores the information in the difference storage unit 32.

Next, the difference reason extracting unit 33 extracts a difference of evaluation histories (sets of evaluation values) of the comparison object user and the active user as the difference reason.

In the case of using the CF, an evaluation value is predicted using similarities of the evaluation history of each user and the evaluation histories of other users. As a result, in the users who have the same evaluation histories, almost the same score is given to the same content. Therefore, when the evaluation histories of the comparison object user and the active user are similar to each other, it is assumed that the score given on the basis of the active user with respect to the content in the object playlist created on the basis of the comparison object user generally becomes high.

Meanwhile, when the content in which the score of the active user is low exists in the object playlist, it is assumed that there is a difference between the evaluation histories of the comparison object user and the active user and the difference becomes the reason why the score of the active user has become low.

Therefore, the difference reason extracting unit 33 reads the evaluation values of the content evaluated by both the comparison object user and the active user, among the feedback information stored in the feedback storage unit 21. In addition, the difference reason extracting unit 33 extracts the content in which the difference of the evaluation values of both the comparison object user and the active user is equal to or larger than the predetermined threshold value as the difference reason. The content that is extracted as the difference reason generally becomes content other than the content included in the object playlist.

For example, the case in which the user U1 (active user) and the user U2 (comparison object user) give evaluation values to pieces of content C21 to C23 as shown in FIG. 12 is examined. In this case, if the threshold value of the difference of the evaluation values is set to 3, the difference of the evaluation values of the users U1 and U2 with respect to the content C23 is 4 larger than the threshold value. Therefore, the content C23 is extracted as the difference reason.

The difference reason extracting unit 33 supplies information showing the extracted difference reason to the display control unit 34.

(Case of Object Playlist Created Using Rule Made by User)

Next, the case in which the difference content and the difference reason are extracted from the object playlist created using the rule made by the user will be described.

First, the evaluation giving unit 25 calculates the score of each content in the object playlist, using the user profile of the active user, by the same method as the case of creating the playlist. Thereby, the score that is based on the active user is given to each content in the object playlist. The evaluation giving unit 25 adds the information showing the score of each content in the playlist to the information regarding the object playlist and supplies the information to the difference extracting unit 31.

The difference extracting unit 31 extracts the content in which the calculated score is smaller than the predetermined threshold value among the content in the object playlist, as the difference content. In addition, the difference extracting unit 31 adds the information of the difference content to the information regarding the object playlist and stores the information in the difference storage unit 32.

Next, the difference reason extracting unit 33 extracts the content determination condition where a satisfaction ratio of each content in the object playlist is low, as the difference reason.

For example, the case in which the playlist PL1 of FIG. 9 is selected as the object playlist and a rule called (content determination condition 1: tempo is equal to or larger than 60) AND (content determination condition 2: sound density is equal to or larger than 40 and is smaller than 60) is shown in the user profile of the active user is examined.

In this case, if the feature amount (refer to FIG. 6) of each content in the playlist PL1 is referred to, the entire content in the playlist PL1 do not satisfy the content determination condition 1 and ⅔ of the entire content in the playlist PL1 satisfy the content determination condition 2. If the threshold value is set to ⅓, a ratio in which the content in the playlist PL1 satisfies the content determination condition 1 becomes 0 smaller than the threshold value. Therefore, the content determination condition 1 is extracted as the difference reason.

The difference reason extracting unit 33 supplies the information showing the extracted difference reason to the display control unit 34.

When the playlist created by the comparison object user or the playlist common to each user is set to the object playlist, a method of extracting the difference content and the difference reason becomes different according to the kind of the user profile.

For example, when the user profile is created on the basis of the evaluation prediction model of the content, the difference content and the difference reason are extracted by the same method as the case of the object playlist created using the CBF.

When the user profile is created on the basis of a set of evaluation values of each user, the difference content and the difference reason are extracted by the same method as the case of the object playlist created using the CF. In this case, when the playlist common to each user is set to the object playlist, an average of the evaluation histories of the users other than the active user is used as the evaluation history of the comparison object user.

When the user profile is created on the basis of the rule made by each user, the difference content and the difference reason are extracted by the same method as the case of the object playlist created using the rule made by the user.

Returning to FIG. 10, in step S54, the display control unit 34 controls display of the playlist. Specifically, the display control unit 34 reads the information regarding the object playlist from the difference storage unit 32. The information of the difference content that is extracted by the processing of step S52 is included in the information regarding the object playlist.

The display control unit 34 generates playlist display data to display the object playlist and transmits the playlist display data to the client 12 of the active user through the communication unit 35 and the network 13. Thereby, in the client 12 of the active user, the object playlist is displayed.

In this case, a specific example of a method of displaying the object playlist will be described with reference to FIGS. 13 to 17.

FIG. 13 shows an example of a method of displaying the object playlist created using the CBF. In this example, the playlist of the user U2 and the playlist of the user U3 are arranged in a vertical direction and are displayed.

First, an icon 101*a* that shows the user U2 is displayed on a left end. On a right side of the icon 101*a*, icons 102*a*-1 to 102*a*-*m* that show content included in the playlist of the user U2 are arranged in a horizontal direction and are displayed. In the icons 102*a*-1 to 102*a*-*m*, jackets of corresponding content (musical compositions) are used.

In this case, the icons 102*a*-1 to 102*a*-*m* are arranged from the left side to the right side in order of the icons in which scores of the corresponding content evaluated by the active user are high and are displayed. Therefore, with respect to the content in which evaluations of the active user and the user U2 are similar to each other and the evaluations of both the active user and the user U2 are high, the corresponding icons are displayed on a left side. Meanwhile, with respect to the content in which the difference of the evaluations of the active user and the user U2 is large and the evaluation of the user U2 is high but the evaluation of the active user is low, the corresponding icons are displayed on a right side. Therefore, the icon that corresponds to the difference content extracted by the processing of step S52 is displayed in the vicinity of the right end.

The sizes of the icons are distinguished according to the scores and are displayed. That is, when the score of the content is equal to or larger than the predetermined threshold value, the corresponding icon is displayed with a large size as the score increases. Meanwhile, when the score of the content is smaller than the predetermined threshold value, the corresponding icon is displayed with a large size as the score decreases.

A difference reason 103 that shows the reason why the difference content in which the score of the active user is low is included in the playlist of the user U2 is displayed. In the case of this example, a "tempo is large" is displayed as the difference reason. Thereby, it can be known that the content in which the evaluation of the active user is low and the "tempo is large" is included in the playlist of the user U2 and the content is extracted as the difference content.

An icon showing the user U3 and icons 102*b*-1 to 102*b*-*n* corresponding to content in a playlist of the user U3 are displayed by the same method as the icon 101*a* and the icons 102*a*-1 to 102*a*-*m*. Although not displayed in this example, a difference reason can be displayed with respect to the playlist of the user U3, similar to the playlist of the user U2.

Thereby, the active user can easily know a difference between the playlist created on the basis of the users U2 and U3 to be the comparison object users and the taste of the active user. The active user can easily know the reason why the difference is generated. In addition, the active user can specifically know the difference of the tastes with other users, so that the active user can easily search a favorite playlist and select the playlist.

FIG. 14 shows an example of a method of displaying an object playlist created using the CF. In this example, the playlist of the user U2 is displayed.

First, an icon 111 that shows the user U2 is displayed on a left end. On a right side of the icon 111, icons 112-1 to 112-*m* that show content included in the playlist of the user U2 are displayed according to order and sizes based on the same standard as the example of FIG. 13.

A difference reason 113 that shows the reason why the difference content in which the score of the active user is low is included in the playlist of the user U2 is displayed. In the case of this example, an icon showing content in which a difference of evaluations between the user U2 and the active user is large is displayed as the difference reason.

Thereby, similar to the example of FIG. 13, the active user can easily know a difference between the playlist created on the basis of the user U2 to be the comparison object user and the taste of the active user. The active user can easily know the reason why the difference is generated.

Figure 15:
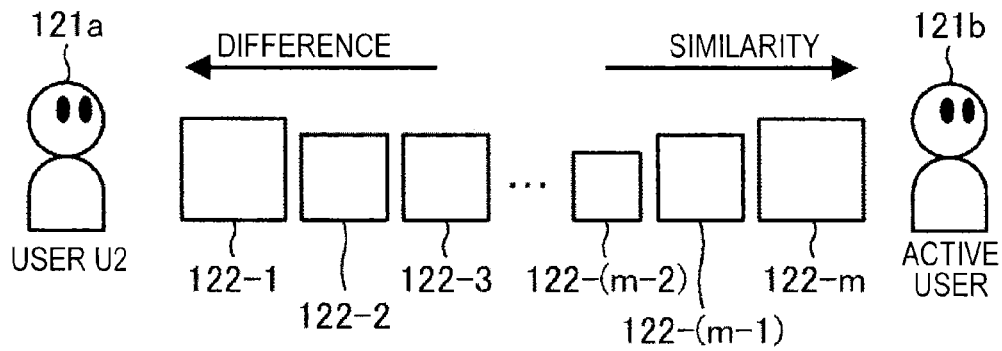
FIG. 15 is a diagram showing a third example of a method of displaying a playlist.

FIG. 15 shows a modification of a method of displaying an icon showing content in a playlist. In this example, the playlist of the user U2 is displayed.

First, an icon 121*a* showing the user U2 and an icon 121*b* showing the active user are divided and are displayed on both ends of the left and right sides. Between the icons 121*a* and 121*b*, icons 122-1 to 122-*m* that show content in the playlist of the user U2 are displayed. In this case, the icons 122-1 to 122-*m* are arranged from the left side to the right side in order of the icons in which the scores of the active user are low and are displayed.

Therefore, with respect to the content in which evaluations of the active user and the user U2 are similar to each other and the evaluations of both the active user and the user U2 are high, the corresponding icons are displayed near the icon 121*b* of the active user. Meanwhile, with respect to the content in which the difference of the evaluations of the active user and the user U2 is large and the evaluation of the user U2 is high but the evaluations of the active user are low, the corresponding icons are displayed near the icon 121*a* of the user U2. Therefore, the icon that corresponds to the difference icon extracted by the processing of step S52 is displayed near the icon 121*a* of the user U2.

Thereby, the active user can easily know the content similar to the taste of the active user and the content different from the taste of the active user and similar to only the taste of the user U2, in the playlist created on the basis of the user U2 to be the comparison object user.

In this example, the difference reason can be displayed, similar to the examples of FIGS. 13 and 14.

Figure 16:
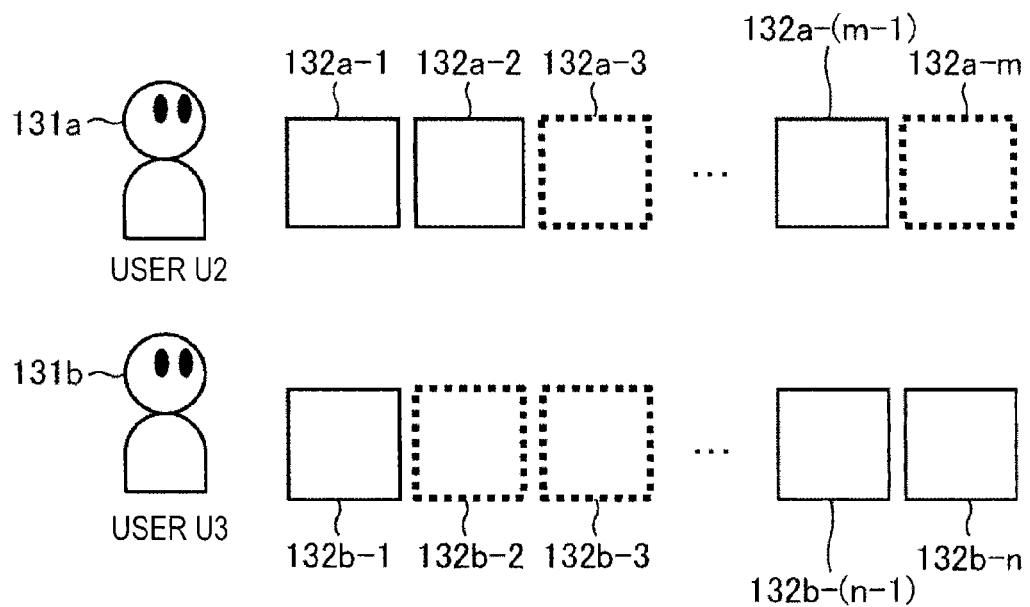
FIG. 16 is a diagram showing a fourth example of a method of displaying a playlist.

FIG. 16 shows another modification of a method of displaying an icon showing content in a playlist. In this example, a playlist of the user U2 and a playlist of the user U3 are arranged in a vertical direction and are displayed.

First, an icon 131*a* that shows the user U2 is displayed on a left end. On a right side of the icon 131*a*, icons 132*a*-1 to 132*a*-*m* that show content included in the playlist of the user U2 are arranged from the left side to the right side according to order in the playlist and are displayed.

In order that icons 132*a*-3 and 132*a*-*m* corresponding to difference content in which the scores of the active user are smaller than the predetermined threshold value, among the icons 132*a*-1 to 132*a*-*m*, are emphasized, the icons 132*a*-3 and 132*a*-*m* are displayed to be distinguished from the other icons. The method of displaying the icons of the difference content is not limited in particular, as long as the icons can be distinguished from the other icons. For example, the icons can be distinguished according to colors or of the icons or kinds of frame lines and are displayed.

An icon 131*b* showing the user U3 and icons 132*b*-1 to 132*b*-*n* corresponding to content in a playlist of the user U3 are displayed by the same method as the icon 131*a* and the icons 132*a*-1 to 132*a*-*m*.

Thereby, the active user can easily know a difference between the playlist created on the basis of the users U2 and U3 to be the comparison object users and the taste of the active user. In addition, the active user can easily know the position of the difference content different from the taste of the active user in the playlist.

In this example, the difference reason can be displayed, similar to the examples of FIGS. 13 and 14.

Figure 17:
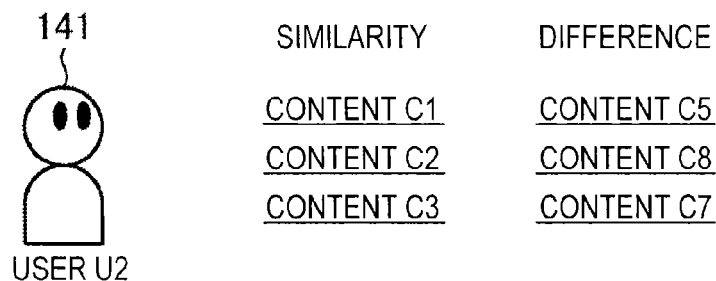
FIG. 17 is a diagram showing a fifth example of a method of displaying a playlist.

FIG. 17 shows a modification of a method of displaying content in a playlist. In this example, the playlist of the user U2 is displayed.

First, an icon 141 showing the user U2 is displayed on a left end. On a right side of the icon 141, content in which the scores of the active user are equal to or larger than the predetermined threshold value and difference content in which the scores of the active user are smaller than the predetermined threshold value are divided in a horizontal direction and are displayed. In this example, pieces of content C1 to C3 that are displayed at the center are content in which the scores of the active user are equal to or larger than the threshold value and evaluations of the active user and the user U2 are similar to each other. Pieces of content C5, C8, and C7 that are displayed on a right end are difference content in which the scores of the active user are smaller than the threshold value and the difference of the evaluations of the active user and the user U2 is large.

The display order of the content may be the score order and may be the order in the playlist. In the content displayed at the center and the content displayed on the right end, kinds or colors of fonts may be changed.

In this way, the user can easily know the difference between the playlist provided from the server 11 and the taste of the user. The user can easily know the reason why the difference is generated. In addition, the user can specifically know the difference of the tastes with other users, so that the user can easily search the favorite playlist and select the playlist.

2. Modifications

Hereinafter, modifications of the embodiment of the present disclosure described above will be described.

First Modification

Modification of Comparison Object User

The number of comparison object users (first users) is not limited to one. For example, a playlist created on the basis of a plurality of user groups may be selected as an object playlist, the plurality of user groups may be set to comparison object users, and difference content and a difference reason may be extracted.

The comparison object user (first user) may be set to the active user (second user). For example, the playlist created on the basis of the active user in the past may be set as the object playlist, the past active user may be set to the comparison object user, and the difference content and the difference reason may be extracted. Thereby, the active user can know the difference of the past taste and the current taste.

Second Modification

Modification of Objects List Displayed

The objects that are list displayed using the present disclosure are not limited to the examples described above. For example, the present disclosure can be applied to the case of list displaying various content using a letter, a sound, and an image such as books, games, software, websites, news, and advertisements, in addition to the music and the moving image.

The present disclosure can be applied to the case in which items other than the content, for example, various commodities and users on a social service are list displayed. For example, when a list of commodities evaluated or purchased by other users are provided to the active user, similar to the example described above, the scores based on the active user may be given to the individual commodities and display of the list of commodities may be controlled on the basis of the given scores.

[Configuration Examples of Computer]

The above mentioned series of processes can be executed by hardware, or can be executed by software. In the case where the series of processes is executed by software, a program configuring this software is installed in a computer. Here, for example, a general purpose personal computer that can execute various functions is included in the computer, by installing a computer incorporated into specialized hardware and various programs.

Figure 18:
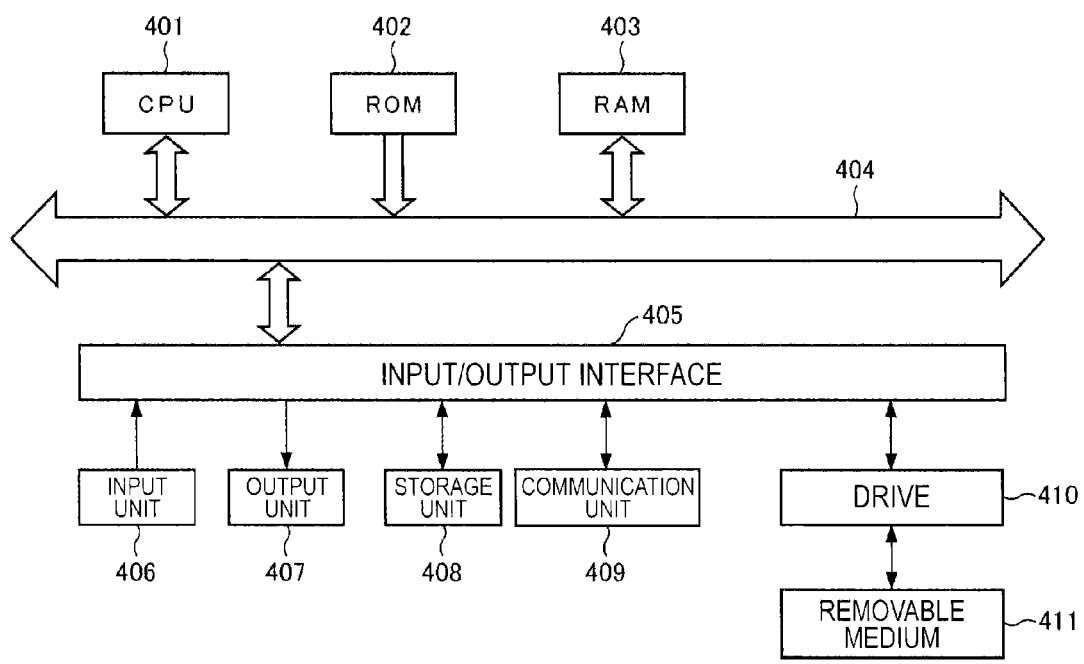
FIG. 18 is a block diagram showing a configuration example of a computer.

FIG. 18 is a block diagram showing a configuration example of hardware of a computer executing the above series of processes by a program.

A CPU (Central Processing Unit) 401, a ROM (Read Only Memory) 402, a RAM (Random Access memory) 403, and a bus 404 are mutually connected in the computer.

An input/output interface 405 is further connected to the bus 404. An input unit 406, an output unit 407, a storage unit 408, a communication unit 409, and a drive 410 are connected to the input/output interface 405.

The input unit 406 includes a keyboard, a mouse, a microphone or the like. The output unit 407 includes a display, a speaker or the like. The storage unit 408 includes a hard disk, a nonvolatile memory or the like. The communication unit 409 includes a network interface or the like. The drive 410 drives a removable medium 411, such as a magnetic disk, an optical disk, a magneto-optical disk, or a semiconductor memory.

In a computer configured such as above, the above mentioned series of processes are executed, for example, by the CPU 401 loading and executing a program, which is stored in the storage unit 408, in the RAM 403 through the input/output interface 405 and the bus 404.

The program executed by the computer (CPU 401) can be, for example, recorded and provided in a removable medium 411 as a packaged medium or the like. Further, the program can be provided through a wired or wireless transmission medium, such as a local area network, the internet, or digital satellite broadcasting.

In the computer, the program can be installed in the storage unit 408 through the input/output interface 405, by installing the removable medium 411 in the drive 410. Further, the program can be received by the communication unit 409 through the wired or wireless transmission medium, and can be installed in the storage unit 408. Additionally, the program can be installed beforehand in the ROM 402 and the storage unit 408.

Note that the program executed by the computer may be a program which performs time series processes, in accordance with the order described in the present disclosure, or may be a program which performs the processes at a necessary timing in parallel, such as when calling is performed.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An information processing apparatus including:
an evaluation giving unit that gives an evaluation based on a second user to an item in a list created on a basis of a first user; and
a display control unit that controls display of the list, on a basis of the evaluation based on the second user.

(2) The information processing apparatus according to (1), further including:
a reason extracting unit that extracts a reason why an item in which an evaluation based on the second user is low is included in the list,
wherein the display control unit performs control in a manner that the extracted reason is displayed together with the list.

(3) The information processing apparatus according to (2),
wherein the evaluation giving unit gives an evaluation to an item in the list, using a model for predicting an evaluation of the second user with respect to the item on a basis of a feature amount of the item, and
wherein the reason extracting unit extracts a feature amount in which a difference in evaluations between the first user and the second user is large among feature amounts of items, as the reason.

(4) The information processing apparatus according to (2),
wherein the evaluation giving unit gives an evaluation to an item in the list, by collaborative filtering based on an evaluation having given by the second user with respect to the item, and
wherein the reason extracting unit extracts an item in which a difference in evaluations between the first user and the second user is large among items already evaluated by the first user and the second user, as the reason.

(5) The information processing apparatus according to (2),
wherein the evaluation giving unit gives an evaluations to an item in the list, on a basis of a condition created by the second user, and
wherein the reason extracting unit extracts the condition where a satisfaction ratio of items in the list is low, as the reason.

(6) The information processing apparatus according to (1) or (2), further including:
a learning unit that learns a model for predicting an evaluation of each user with respect to an item, on a basis of a feature amount of the item,
wherein the evaluation giving unit gives an evaluation to an item in the list created using the model of the first user, using the model of the second user.

(7) The information processing apparatus according to (1) or (2),
wherein the evaluation giving unit gives an evaluation to an item in the list created on a basis of an evaluation predicted by collaborative filtering based on an evaluation having given by the first user with respect to an item, by the collaborative filtering based on an evaluation having given by the second user with respect to an item.

(8) The information processing apparatus according to (1) or (2),
wherein the evaluation giving unit gives an evaluation to an item in the list created on a basis of a condition created by the first user, on a basis of a condition created by the second user.

(9) The information processing apparatus according to any one of (1) to (8),
wherein the display control unit performs control in a manner that items in the list are distinguished by the evaluation based on the second user and are displayed.

(10) The information processing apparatus according to (9),
wherein the display control unit performs control in a manner that an item in which an evaluation based on the second user is low is emphasized and is displayed.

(11) An information processing method performed by an information processing apparatus, the method including:
giving an evaluation based on a second user to an item in a list created on a basis of a first user; and
controlling display of the list, on a basis of the evaluation based on the second user.

(12) A program for causing a computer to execute processing including:
giving an evaluation based on a second user to an item in a list created on a basis of a first user; and
controlling display of the list, on a basis of the evaluation based on the second user.

The present disclosure contains subject matter related to that disclosed in Japanese Priority Patent Application JP 2012-120723 filed in the Japan Patent Office on May 28, 2012, the entire content of which is hereby incorporated by reference.

What is claimed is:

1. An information processing apparatus, comprising:
a server comprising one or more processors configured to:
give an evaluation score based on a second user to one or more items in a list, wherein the list is created based on a first user;
extract a reason, associated with the evaluation score, for including an item in the list;
control display of the list, based on the evaluation score based on the second user; and
extract, based on a model to predict an evaluation for each user in accordance with feature amounts of content of an item to give the evaluation scores to the one or more items in the list, a feature amount of content of an item, in which a difference in evaluation scores between the first user and the second user is greater than a value among the feature amounts of the one or more items, as the reason.

2. The information processing apparatus according to claim 1, wherein based on a determination that the one or more processors are further configured to give the evaluation score to the one or more items in the list, by collaborative filtering based on the evaluation score having been given by the second user with respect to the one or more items,
the one or more processors are further configured to extract an item in which a difference in evaluation scores between the first user and the second user is greater than a value among the items already evaluated by the first user and the second user, as the reason.

3. The information processing apparatus according to claim 1, wherein the one or more processors are further configured to give the evaluation score to the item in the list, in accordance with a condition created by the second user.

4. The information processing apparatus according to claim 1, wherein the one or more processors are further configured to learn the model to predict the evaluation of each user with respect to an item, based on the feature amounts of content of the item,
wherein the one or more processors are further configured to give the evaluation to the one or more items in the list created based on the model learned by the one or more processors.

5. The information processing apparatus according to claim 1, wherein the one or more processors are further configured to give the evaluation score to the item in the list created based on the evaluation predicted by collaborative filtering based on the evaluation having been given by the first user with respect to the item, and by the collaborative filtering based on the evaluation score having been given by the second user with respect to the item.

6. The information processing apparatus according to claim 1, wherein the one or more processors are further configured to give the evaluation score to the item in the list created based on a condition created by the first user or based on a condition created by the second user.

7. The information processing apparatus according to claim 1, wherein the one or more processors are further configured to control such that items in the list are distinguished by the evaluation score based on the second user and are displayed.

8. The information processing apparatus according to claim 7, wherein the one or more processors are further configured to control such that an item in which the evaluation score based on the second user is low is emphasized and is displayed.

9. An information processing method, the method comprising:
giving an evaluation score based on a second user to one or more items in a list, wherein the list is created based on a first user;
extracting a reason, associated with the evaluation score, for including an item in the list;
controlling display of the list, based on the evaluation score of the second user; and
extracting, based on a model to predict an evaluation for each user in accordance with feature amounts of content of an item to give the evaluation scores to the one or more items in the list, a feature amount of content of an item, in which a difference in evaluation scores between the first user and the second user is greater than a value among feature amounts of the one or more items, as the reason.

10. A non-transitory computer-readable medium having stored thereon, computer-executable instructions for causing a computer to execute operations, the operations comprising:
giving an evaluation score based on a second user to one or more items in a list, wherein the list is created based on a first user;
extracting a reason, associated with the evaluation score, for including an item in the list;
controlling display of the list, based on the evaluation score based on the second user; and
extracting, based on a model to predict an evaluation for each user in accordance with feature amounts of content of an item to give the evaluation scores to the one or more items in the list, a feature amount of content of an item, in which a difference in evaluation scores between the first user and the second user is greater than a value among feature amounts of the one or more items, as the reason.

* * * * *